Aug. 19, 1924.

A. C. HAGEN

PAN LIFTER

Filed Sept. 1, 1923

1,505,258

Inventor
Arthur C. Hagen

By Herbert E. Smith
Attorney

Patented Aug. 19, 1924.

1,505,258

UNITED STATES PATENT OFFICE.

ARTHUR C. HAGEN, OF SPOKANE, WASHINGTON.

PAN LIFTER.

Application filed September 1, 1923. Serial No. 660,624.

*To all whom it may concern:*

Be it known that I, ARTHUR C. HAGEN, a citizen of the United States, residing at Spokane, in Spokane County and State of Washington, have invented certain new and useful Improvements in Pan Lifters, of which the following is a specification.

My present invention relates to improvements in pan lifters designed especially for use in handling pie pans and similar utensils.

The primary object of the invention is the provision of a device of this character that is inexpensive in cost of production, simple in its construction, and which may be manipulated with facility when handling hot pans or when placing such utensils in the hot oven. The lifter is provided with means whereby it may with facility be adapted for use with either large size pans or with comparatively smaller pans and utensils, and the invention consists in certain novel combinations and arrangements of parts as will be hereinafter more specifically set forth.

In the accompanying drawings I have illustrated one complete example of the physical embodiment of my invention wherein the parts are combined and arranged according to the best mode I have thus far devised for the practical application of the principles of my invention.

The main portions of the implement are fashioned by suitable tools or machinery of a single piece of wire and provided with a handle 1, which is formed with an end suspending loop 1ª, and the bent members forming the handle may be twisted as shown to brace and strengthen the implement.

Figure 2:
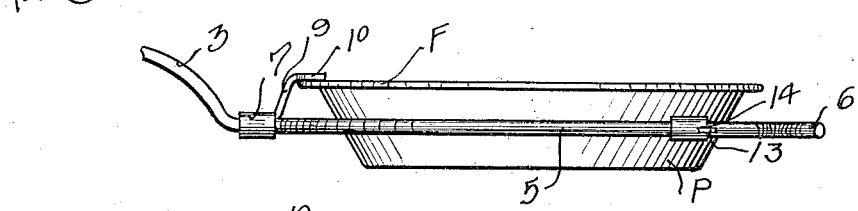
Figure 2 is a view in side elevation showing the device applied for use with a pan, a portion of the handle being broken away.

The two curved portions 2 and 3 of the handle diverge and form the two tines 4 and 5, and these tines terminate in outwardly bent ends 6. The wire of which the tines are composed forms a resilient bow-shaped member of suitable size to partly embrace the body P of a pie pan as shown in Fig. 2 and afford a support for the pan while it is being manipulated.

Figure 3:
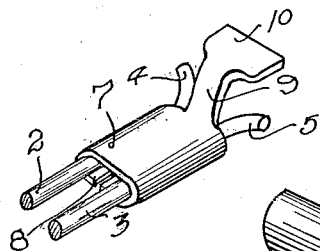
Figure 3 is an enlarged detail perspective view showing the retaining clip for the tines.

By means of a retaining clip or sleeve 7 a rigid joint is made between the curved arms 2 and 3 and the tines 4 and 5 and this clip, which is preferably of sheet metal, is bent around to clasp the two arms, with its ends 8 brought into close relationship as shown in Fig. 3.

From the top portion of the clip an arm 9 rises, and this arm terminates in a flat head 10, which projects laterally of the arm to insure the required bearing face at the under side of the head to engage over the top of the flange F of the pan. The utility of this flat head will be apparent from an inspection of Fig. 2 where it will be seen that the head extends over the edge of the flange F to retain the pan from tipping or tilting when supported in the tines as shown. The tines thus support the pan from below while the head on the clip retains the pan from above, resulting in a stable carrying position for the pan while supported in the lifter. The lifter may be manipulated with dexterity when the bowed tines are slipped around the body of the pan and embrace the latter, while the flat head may at the same time be guided to and slipped over the flange into the position as shown in Fig. 2.

When using the lifter with a small pan, or one of less diameter than that for which the embracing tines 4 and 5 are designed, I utilize a pair of supporting plates supported from the oppositely arranged tines and adapted to engage the outer face of the pan P. These supporting devices are indicated as 11 and 12 and consist of metal plates, disposed in horizontal position and extending toward one another when in use. Each plate is provided with a slide sleeve 12' that is fitted over the tine, as 4 or 5, and engages the tine with sufficient friction in order that the sleeve may be retained in adjusted position on the tine.

Figure 1:
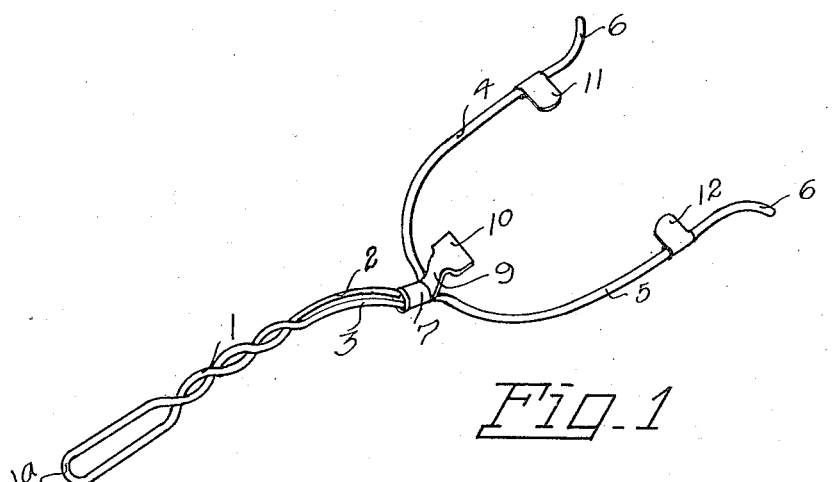
Figure 1 is a perspective view of the pan lifter showing it adapted for use with small size pans.
Figure 4:
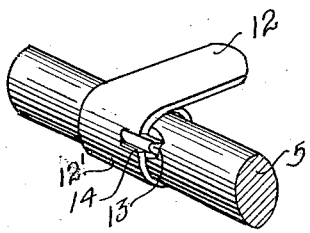
Figure 4 is an enlarged, detail perspective view showing the manner of securing the supporting plates on the tines.

When not used these plates hang downwardly from the tines, but when the lifter is used on a pan of small diameter the plates are turned to the horizontal position indicated in Figs. 1 and 2. For retaining the plates in operative position I utilize on each tine a lug 13, which is rigid with the tine and projects laterally from the outer side of the tine. Each sleeve 12' is provided with a notch 14 and it will be apparent that when the sleeve is slid to proper position the notch will slip over the lug as in Fig. 4 to frictionally engage therewith, and together with the frictional contact between the sleeve 12' and the tine, the plates are retained in operative position.

From the above description the construction and utility of the device will be apparent, and the drawings show the relation of parts. It will be apparent however that changes and alterations may be made in the device as illustrated, within the scope of my claims, without departing from the spirit of the invention.

Having thus fully described my invention, what I claim as new and desire to secure by Letters Patent is:

1. A pan lifter comprising a single wire bent to form a handle and terminating in diverging, bow shaped tines, a metal clip embracing the bent portion of the wire at the junction of the handle and tines, an integral arm on said clip, and a flattened, laterally projecting head on said arm.

2. A pan lifter comprising a handle and bowed tines, a retaining clip at the junction of the handle and tines, an integral arm on said clip and a flattened laterally projecting head on said arm, of lugs on said tines and a pair of notched slide sleeves engaging said lugs, and an inwardly projecting supporting plate extending from said sleeves.

In testimony whereof I affix my signature.

ARTHUR C. HAGEN.